Sept. 5, 1967  D. T. CLARE  3,339,308
IRRIGATING DEVICE
Filed Dec. 10, 1965  3 Sheets-Sheet 1

INVENTOR.
DONALD T. CLARE
BY
*McLaughlin, Cahill & Drummond*
ATTORNEYS

INVENTOR.
DONALD T. CLARE 3,339,308
IRRIGATING DEVICE
Donald T. Clare, Phoenix, Ariz., assignor to
Dac Corporation, a corporation of Arizona
Filed Dec. 10, 1965, Ser. No. 513,129
5 Claims. (Cl. 47—1.2)

The present invention pertains to irrigation devices, and more particularly, to an irrigating device for use in connection with hydroponic agriculture.

Hydroponic agricultural phenomena have long been recognized and have been utilized in the production of a variety of foods. In more recent years, hydroponic facilities have been designed for the development of animal feeds and feed supplements to increase the growth rate and growth of food animals such as cattle. The nutritional value of hydroponic feed has readily been established; however, the ability to produce sufficient quantities of hydroponically grown feed has been a contributing factor to the delay with which the cattle feeding industry has adopted hydroponic food.

Prior art irrigating devices for utilization in hydroponic farming have characteristically utilized small trays to support the hydroponically grown feed (usually barley or oats). These trays are characteristically stacked in a framework such that a large number of trays are arranged in "pigeonhole" fashion. Each tray must be associated with a corresponding pan or irrigating tray to receive the nutrient-rich fluid fed to the plants. The usual procedure includes the flooding of these pans associated with the top row of trays with the subsequent drainage and refilling of pans at lower levels. The labor involved in the irrigation procedure and in the loading and reloading procedure accompanying the prior art irrigating designs has substantially reduced the efficiency and therefore increased the cost of the hydroponic feed. Accompanying the inefficiency of prior art irrigating devices is the awkwardness with which the devices must be loaded and unloaded and the low yield rate per unit of labor involved. The low yield rate militates against the utilization of such devices for feeding large number of cattle.

It is therefore an object of the present invention to provide an irrigating device that may more efficiently be employed to irrigate hydroponic-type feeds.

It is another object of the present invention to provide an irrigating device for conveniently irrigating trays of hydroponic plants, the trays being of substantially increased size over those of the prior art.

It is still another object of the present invention to provide an irrigating device that may conveniently be loaded and unloaded and also may conveniently be utilized to provide the necessary nutrient-rich fluid to the trays.

These and other objects of the present invention will become apparent to those skilled in the art as the description thereof proceeds.

Briefly, in accordance with one embodiment of the present invention, an irrigating device is provided utilizing an irrigation well positioned below a framework supported for rotation about an axis. The framework supports a plurality of trays, each pivotally connected to the frame such that as the frame rotates about the axis, the trays are raised and lowered much in the same fashion as a "ferris wheel." As the trays approach the lowermost position, they are lowered into the irrigation well containing the nutrient-rich liquid.

The present invention will be described in terms of a specific embodiment; it will be obvious to those skilled in the art that a variety of alternative arrangements may be utilized without departing from the spirit and scope thereof.

The present invention may more readily be described by reference to the accompanying drawings in which.

Figure 1:
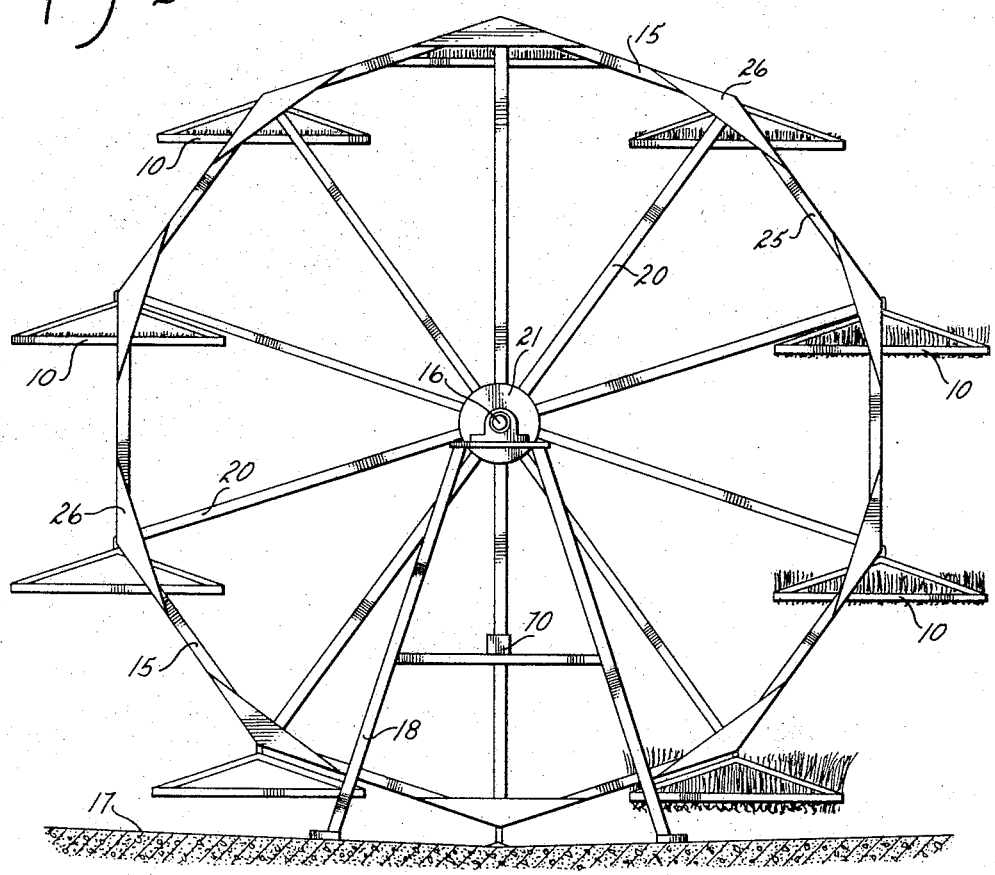
FIGURE 1 is a side elevational view of an irrigating device constructed in accordance with the teachings of the present invention.
Figure 2:
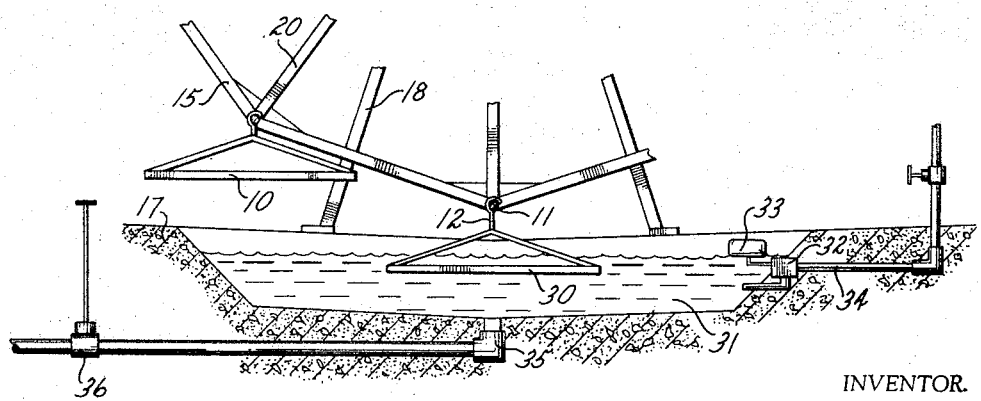
FIGURE 2 is a side elevational view of a portion of FIGURE 1 and showing the irrigating well positioned beneath the rotating frame.

Referring to FIGURES 1 and 2, a plurality of trays 10 are shown, each supported on a bar or rigid member 11 extending perpendicular to the plane of the drawings. Each of the trays 10 is secured to the members 11 through the utilization of hooks 12 secured to the trays and extending over the bars 11. The trays are distributed around the periphery of the wheel 15 pivotally supported about an axis defined by the shaft 16. The shaft 16 is supported above a ground floor 17 through the expediency of a convenient A-frame 18. The wheel 15 comprises a plurality of radially extending spokes 20, each appropriately connected to a hub 21 at the inner end thereof and secured to an outer framework including joining frame members 25 and gusset plates 26.

Figure 3:
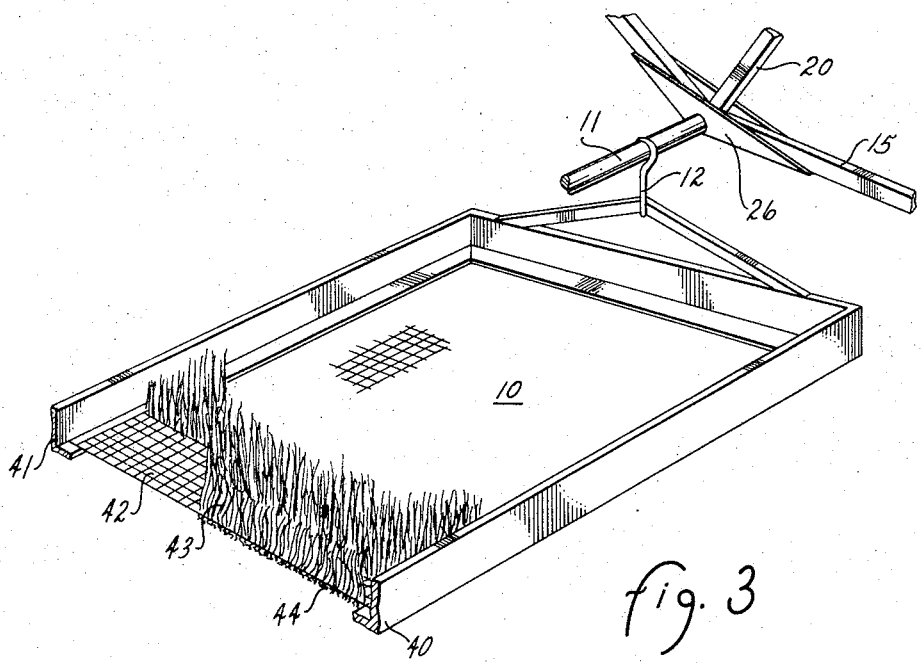
FIGURE 3 is an enlarged sectional view of a portion of FIGURE 1 showing a tray and the manner in which the tray supports hydroponic feed.

It may be seen that each of the trays 10 will extend in a horizontal plane and will also depend from the bars 11 simply by the action of gravity. As the wheel 15 is rotated, the lowermost tray 30 will be lowered into an irrigation well 31 containing a nutrient-rich liquid. The well 31 may be formed in the ground floor 17 or, alternatively, may be formed through the utilization of an appropriate container positioned on top of the ground floor 17 provided, however, the support frame comprising the rotating wheel 15 is positioned appropriately to permit the trays to extend into the well. In the embodiment chosen for illustration, a conventional float valve 32 and float 33 is shown connecting a pipe 34 into the well 31. In this manner, the level of the liquid in the well may be maintained at the correct height. A drain 35 is also provided and is connected through a valve 36 to a suitable disposal facility. The liquid contained in the well 31 must be changed periodically to insure the proper nutrient value of the liquid and also to prevent the unwanted growth of algae or similar life in the well. The construction of the trays may more readily be seen by reference to FIGURE 3. The tray 10 includes side rails 40 having a shelf 41 for supporting a wire mesh 42. The mesh 42 is not sufficiently fine to contain the seeds of the crop to be grown; however, a layer of paper (not shown) is customarily laid on top of the wire mesh when seeds are placed in the tray. As the seeds germinate and grow, the paper disintegrates resulting in a matt of green shoots 43 having a correspondingly thick matt of roots 44 extending through and entwined with the mesh 42.

Figure 4:
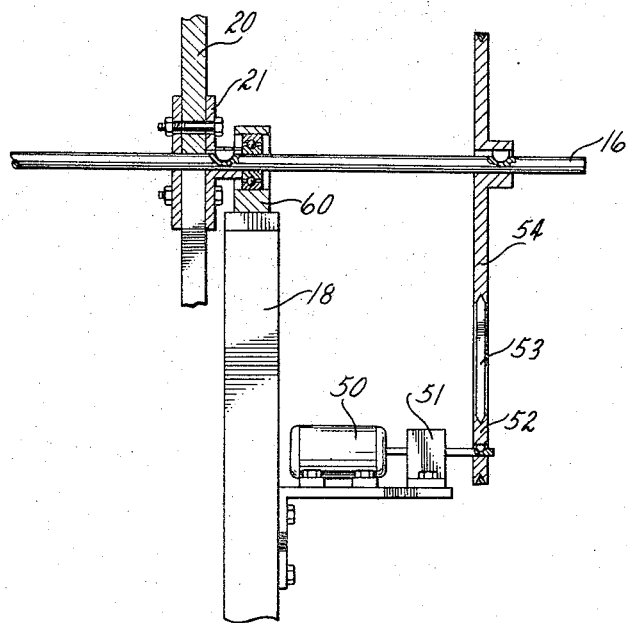
FIGURE 4 is a front elevational view of a suitable means for driving the frame of FIGURE 1.

The rotating wheel, or frame supporting the trays, may conveniently be rotated through the utilization of an electric motor such as shown in FIGURE 4. Referring to FIGURE 4, an electric motor 50 is shown connected through a gear reduction box 51 to a pulley 52. A second pulley 54 keyed to the shaft 16 is driven by the pulley 52 through the expediency of a V-belt 53. The shaft rotates in a pillow block 60 and drives the hub 21 which, in turn, drives the spokes 20. It will be obvious to those skilled in the art that it is not necessary to drive the shaft 16; rather, it may be found advantageous to journal the rotating supporting frame or wheel 15 on the frame 18 and drive the wheel directly without using a rotating shaft. The electric motor 50 may be energized from a conventional power source; however, it has been found advantageous to utilize an electric timer that periodically energizes the electric motor to advance the rotating wheel and to thereby lower a tray into the irrigation well. The positioning of the trays in the irrigation well may conveniently be accomplished through the utilization of microswitches positioned on the A-frame such as shown at 70 in FIGURE 1. It will be immediately evident to those having electrical circuit skills that a variety of circuits may be utilized to automatically energize the electric motor 50 to lower each of the trays into the irrigation well at predetermined intervals and for predetermined times.

Figure 5:
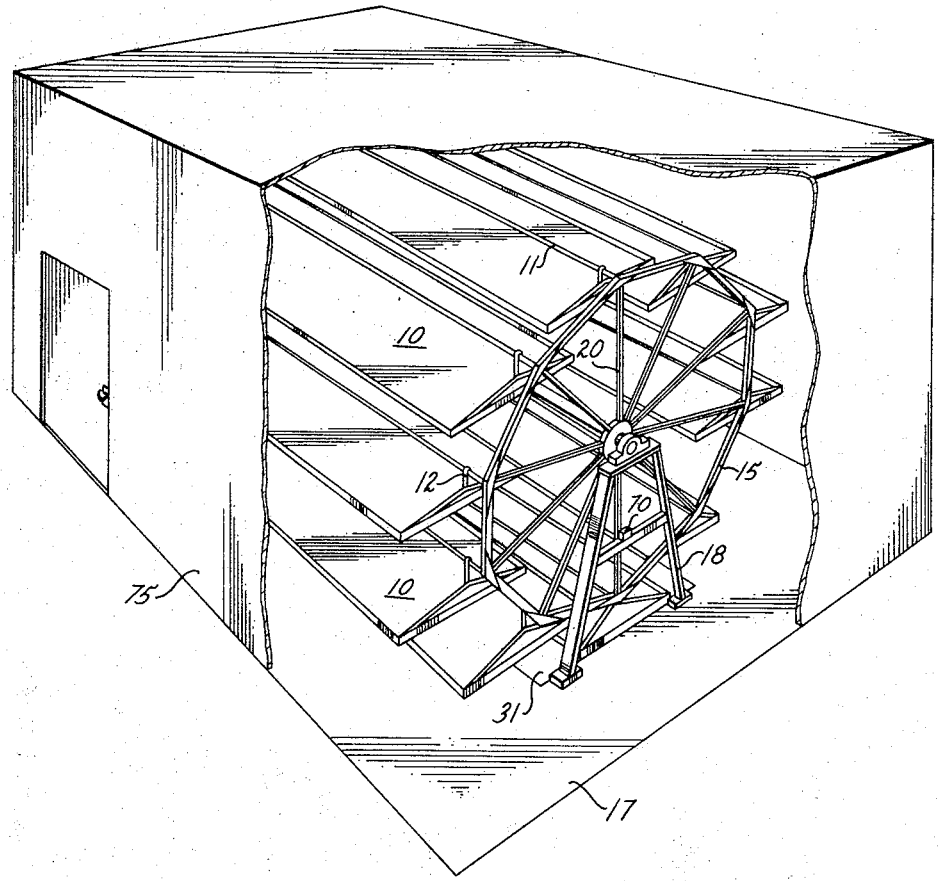
FIGURE 5 is a perspective view schematically representing a typical hydroponic unit installed in a building and showing a typical arrangement for the high production of hydroponic-type feed supplements.

Referring to FIGURE 5, the irrigating device of the present invention may be shown enclosed within a building 75. One of the chief advantages of the concept of the present invention is that the irrigating device may be made modular. For example, the building 75 may be constructed on a conventional foundation 24 feet by 24 feet in dimension. The well characteristically will be 22 feet long and 6 feet wide, the wheel will be 14 feet in diameter and each of the trays will be 4 feet wide and 10 feet long (two trays being carried side by side on each supporting bar of the wheel). The building 75 usually requires no external light and will therefore contain no windows; light for the growing process can readily be supplied through the utilization of conventional fluorescent lamps.

The operation of the irrigating device of the present invention may be described as follows. A tray 10 is selected and a suitable paper is placed on the wire mesh thereof. Pretreated seeds are then placed on the paper in the tray in a layer approximately ½ inch thick. The tray is then lowered into the irrigation well for a length of approximately 15 minutes and then removed. The tray is lowered into the irrigation well once in each 24-hour period. The tray may conveniently be placed on the rotating supporting frame or wheel 15 without having to lift the tray from an overhead position and no time-consuming flooding and draining of irrigation pans is required. The utilization of the system of the present invention permits the trays to be loaded onto the rotating wheel at a height appropriately positioned for convenience of the operators. Further, the trays may be made considerably larger than in a stacked position. The rotating wheel is thus rotated every 24 hours and is stopped at a soaking or irrigating position for 15 minutes for each tray. Each tray is irrigated for approximately 6 days, after which time the tray may be removed and replaced with a fresh tray adding new seeds thereon. The removed tray may then be relieved of its now mature hydroponic feed and may be reused when the next tray is removed.

As stated previously, the present invention has been described in terms of a specific embodiment; it will be apparent to those skilled in the art that many alternatives may be used for the mechanical arrangement of parts described herein. It is contemplated that the scope of the present invention should not be limited by the specific embodiment chosen for illustration.

I claim:
1. An irrigating device comprising: a plurality of trays, each including means for supporting seeds and plants to be irrigated; an irrigation well; a shaft supported above said irrigation well; a support frame mounted on said shaft and rotatable about the axis of said shaft; means pivotably supporting said trays on said support frame; said shaft and support frame positioned relative to said irrigation well to permit said trays to sequentially extend into said well when said support frame is rotated about the axis of said shaft, said support frame comprising a pair of wheels pivoted on said shaft and axially spaced from each other.

2. An irrigating device comprising: a plurality of trays, each including means for supporting seeds and plants to be irrigated; an irrigation well; a shaft supported above said irrigation well; a support frame mounted on said shaft and rotatable about the axis of said shaft; means pivotably supporting said trays on said support frame; said shaft and support frame positioned relative to said irrigation well to permit said trays to sequentially extend into said well when said support frame is rotated about the axis of said shaft, said support frame comprising a pair of wheels pivoted on said shaft and axially spaced from each other, said wheels secured to each other with rigid members extending from the face of one wheel longitudinally of said shaft to the face of the other wheel.

3. An irrigating device defined in claim 2 wherein said means pivotally supporting said trays comprises hook members secured to said trays and extending over said rigid members.

4. An irrigating device comprising: a plurality of trays, each including means for supporting seeds and plants to be irrigated; an irrigation well; a frame rotatably supported above said irrigation well; means pivotally supporting said trays on said frame; said frame positioned relative to said irrigation well to permit said trays to sequentially extend into said well when said frame is rotated, said frame comprising a pair of wheels pivoting on said shaft and axially spaced from each other, said wheels secured to each other with rigid members extending through the face of one wheel to the face of the other wheel.

5. An irrigating device defined in claim 4 wherein said means pivotally supporting said trays comprises hook members secured to said trays and extending over said rigid members.

References Cited

UNITED STATES PATENTS

| 2,244,677 | 6/1941 | Cornell | 47—17 |
| 2,824,410 | 2/1958 | Daw | 47—1 |

FOREIGN PATENTS

| 205,449 | 9/1939 | Switzerland. |
| 301,474 | 10/1917 | Germany. |

ABRAHAM G. STONE, *Primary Examiner.*
ROBERT E. BAGWILL, *Examiner.*